United States Patent
Manchester et al.

(10) Patent No.: US 6,915,277 B1
(45) Date of Patent: Jul. 5, 2005

(54) METHOD FOR DUAL CREDIT CARD SYSTEM

(75) Inventors: Jeff Manchester, Covington, KY (US); Michelle Dupree-Cammer, Broomfield, CO (US)

(73) Assignee: General Electric Capital Corporation, Stamford, CT (US)

( * ) Notice: Subject to any disclaimer, the term of this patent is extended or adjusted under 35 U.S.C. 154(b) by 1048 days.

(21) Appl. No.: 09/593,199

(22) Filed: Jun. 14, 2000

Related U.S. Application Data

(60) Provisional application No. 60/202,980, filed on May 10, 2000.

(51) Int. Cl.$^7$ .............................................. G06F 17/60
(52) U.S. Cl. ....................................................... 705/39
(58) Field of Search ............................. 705/39, 68, 69, 705/70, 53, 35, 40, 41, 42

(56) References Cited

U.S. PATENT DOCUMENTS

| | | |
|---|---|---|
| 5,193,114 A | 3/1993 | Moseley |
| 5,276,311 A | 1/1994 | Hennige |
| 5,506,395 A | 4/1996 | Eppley |
| 5,530,232 A | 6/1996 | Taylor |
| 5,544,246 A | 8/1996 | Mandelbaum |
| 5,578,808 A | 11/1996 | Taylor |
| 5,649,118 A | 7/1997 | Carlisle et al. |
| 5,748,737 A * | 5/1998 | Daggar .................. 705/41 |
| 5,770,843 A | 6/1998 | Rose et al. |
| 5,826,243 A | 10/1998 | Musmanno et al. |
| 5,844,230 A | 12/1998 | Lalonde |
| 5,859,419 A | 1/1999 | Wynn |
| 5,864,830 A * | 1/1999 | Armetta et al. ............ 705/41 |
| 5,883,377 A | 3/1999 | Chapin, Jr. |
| 5,914,472 A | 6/1999 | Foladare |
| 5,984,191 A | 11/1999 | Chapin, Jr. |
| 6,024,286 A | 2/2000 | Bradley et al. |
| 6,032,136 A | 2/2000 | Brake, Jr. et al. |
| 6,047,067 A * | 4/2000 | Rosen ........................ 705/68 |
| 6,047,267 A | 4/2000 | Haddock et al. |
| 6,138,917 A | 10/2000 | Chapin, Jr. et al. |
| 6,144,948 A * | 11/2000 | Walker et al. ................ 705/38 |
| 6,145,739 A | 11/2000 | Oliver et al. |
| 6,163,771 A * | 12/2000 | Walker et al. ................ 705/18 |
| 6,205,553 B1 | 3/2001 | Arditti et al. |
| 6,220,510 B1 | 4/2001 | Miller et al. |
| 6,315,195 B1 | 11/2001 | Ramachandran |
| 6,327,348 B1 | 12/2001 | Jordasch et al. |
| 6,353,811 B1 | 3/2002 | Weissman |
| 6,427,909 B1 | 8/2002 | Berstis et al. |
| 6,427,911 B1 | 8/2002 | Berstis et al. |
| 6,431,443 B1 | 8/2002 | Berstis et al. |
| 6,631,849 B2 | 10/2003 | Blossom |
| 2001/0032192 A1 | 10/2001 | Putta et al. |
| 2001/0048023 A1 | 12/2001 | Fitzmaurice et al. |
| 2002/0029191 A1 | 3/2002 | Ishibashi et al. |
| 2002/0095386 A1 | 7/2002 | Maritzen et al. |

FOREIGN PATENT DOCUMENTS

| | | | |
|---|---|---|---|
| WO | WO 92/13322 | * | 8/1992 |
| WO | WO 02/47022 A1 | | 6/2002 |

* cited by examiner

*Primary Examiner*—Vincent Millin
*Assistant Examiner*—Sandra Snapp
(74) *Attorney, Agent, or Firm*—Buckley, Maschoff & Talwalkar LLC

(57) ABSTRACT

A dual credit card system is in two parts: a) the creation of a dual credit card; and b) the usage of a dual credit card. The creation begins with the receipt of an application by merchant for a dual credit card. The issuing organization issues the dual credit card to the applicant. The user may make a purchase with the dual credit card at either a private label merchant location or at a location accepting the bankcard. These locations may traditional physical locations, a web site on the Internet or a catalog. When a purchase is made at a merchant location, the processing of the merchant location dual credit card purchase is done via a private-label processing channel. If the user uses the dual credit card at a non-merchant location, the purchase may be processed through the VISA/MasterCard network.

20 Claims, 2 Drawing Sheets

METHOD FOR DUAL CREDIT CARD SYSTEM

CROSS-REFERENCE TO RELATED APPLICATIONS

This application claims the benefit of U.S. provisional patent application Ser. No. 60/202,980 filed May 10, 2000.

BACKGROUND OF THE INVENTION

The invention is related to a credit card system, in particular to the implementation of a dual credit card system including the creation and usage of a dual credit card.

There are three types of consumer credit cards generally available to the public. The first type of card is a bankcard such as issued by a bank or other financial institution. Typical examples are a VISA®, MasterCard®, DISCOVER® or American Express Optima® cards. These cards allow purchase of goods and services and charges can be paid off monthly or have a portion paid monthly with remaining balance subject to interest. The user may pay an annual fee as well. There are usually different levels of these cards that range from a standard card, to a Gold Card or Platinum Card with different annual charges and different services. The credit provider sets a dollar limit depending upon the credit worthiness of the cardholder. The merchant pays an interchange fee based upon a percentage of the amount of the individual charge.

The second type of card is a charge card such as the American Express® series of cards. These cards allow the user to charge purchases and services to the account. The customer is expected to pay the balance in full monthly. There is usually no interest charged. The limit on purchases is not usually geared to any set amount but based upon the users usage history. There is an annual fee paid by the cardholder and the merchant pays a fee similar to the interchange fee based on the level of purchase. The American Express fee paid by the merchant is usually higher than the typical bankcard interchange fee.

The third type of card is the "private label" credit card. A private label credit card is issued by or on behalf of, a merchant such as Wal-Mart, Sears, or Brooks Brothers (some issued and serviced by the merchant, some issued and serviced by a financial institution). The financial transaction works very similar to a bankcard. The private label credit card's use is usually limited to the merchant issuing/sponsoring the credit card. The private label card user may pay the monthly charges or partially pay the balance and pay interest on the unpaid balance as with a bankcard. The merchant pays the financial institution a fee similar to the interchange fee of a bankcard. This fee is usually lower than the interchange fee with a bankcard. There are some retailers who issue and service their own private label card. Then there are companies like GE Capital who issue cards that are private labeled in the name of a retailer.

Consumers like the convenience of credit cards and like to take advantage of the services available from the various credit card services. However they find themselves having too many credit cards. An advantage of the private label credit card is the availability of special promotional financing offers (such as "no interest for x months" promotions) and merchandise information from the issuer or associated merchant of the private label credit card. The primary advantage of the bankcard is the almost universal acceptance world wide of a VISA® card, MasterCard®, or DISCOVER® card. These cards also typically have lower interest rates.

The merchants prefer that their customers use their private label credit card so that the merchant can use the monthly mailings as a vehicle of developing customer loyalty through special offers and other merchandising efforts. The merchants also prefer not to pay the higher interchange fees associated with generally available bankcards or the American Express card. The merchants also like the idea of a dedicated credit line for use in their retail store. However, many customers are reluctant to carry any more plastic in their wallets than absolutely necessary.

Therefore there is a need for a "dual credit card" that provides the merchant and consumers of the bankcard and the private label credit card.

BRIEF SUMMARY OF THE INVENTION

The dual credit card system is in two parts: a) the creation of a dual credit card and b) the usage of a dual credit card. The creation begins with the receipt of an application by the merchant for a dual credit card. The issuing organization determines the interest rate and the credit line and issues the dual credit card to applicant. This is a combined private label and bankcard product with one interest rate and one credit line. That credit line will have a portion which is available only at the merchant's location. The issuer will determine that single credit line and the interest rate.

The user may make a purchase with the dual credit card at either a private label merchant location or at a location accepting the bankcard. Either location may be an Internet site or a physical location. For the purposes of this application a location includes physical locations as well as an Internet sites. When a purchase is made at a merchant location, the processing of the merchant location dual credit card purchase is done via a private-label processing channel. The private-label channel interchange fee is paid as part of this process. The private label back office operation processes the merchant location purchase as a private label purchase and then feeds the transaction to the bankcard issuer or subsequent processor. The transaction is then incorporated into the bankcard balance and statement.

If the user uses the dual credit card at a non-merchant location, the purchase may be processed through the VISA/MasterCard network. The network interchange fee is paid as part of this process. The cooperating bankcard back office operation process the non-merchant purchase as a bankcard purchase. A key element of this dual card process is the use of a bankcard facility for both bankcard purchases and private label services.

Since the bankcard back office operation is processing both private-label purchases and bankcard purchases for the dual card user, cardholder statements may include merchant promotion material as well as normal operational customer service matters for both the merchant channel as well as the bankcard channel. The customer service functions may include normal customer service matters as well as collections and settlement issues.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings, which are meant to be exemplary, not limiting, and wherein.

DETAILED DESCRIPTION OF THE INVENTION

Figure 1:
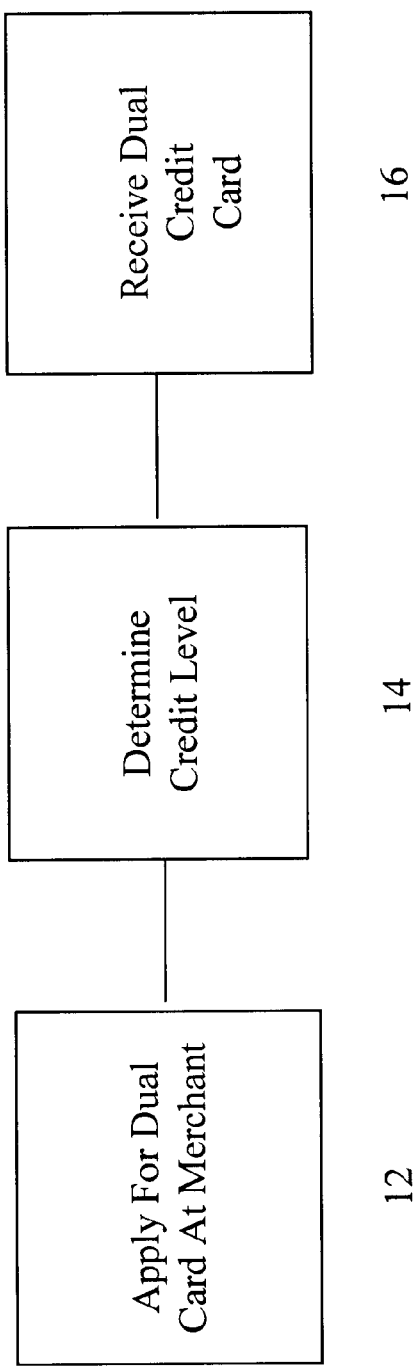
FIG. 1 illustrates the flow diagram of a dual credit card acquisition.

FIG. 1 illustrates the flow diagram of a customer's acquisition of a dual credit card 10. A prospective credit card customer applies for the dual credit card 12 at a merchant issuing/sponsoring a private label credit card. The dual card will be a bankcard branded with the merchant's name and will appear like a bankcard such as (VISA®, MasterCard®, DISCOVER® or other "general purpose" credit cards). The applicant provides personal, credit and employment information to the dual credit card issuer. Based upon the information supplied, the financial institution issuing the bankcard assigns a credit limit and/or an interest rate 14 and issues the credit card 16 to the applicant. A key element is that the dual credit card issuer is a cooperating financial institution that is issuing the dual credit card as a bankcard for non-merchant sales and a private label credit card for in-merchant sales.

Figure 2:
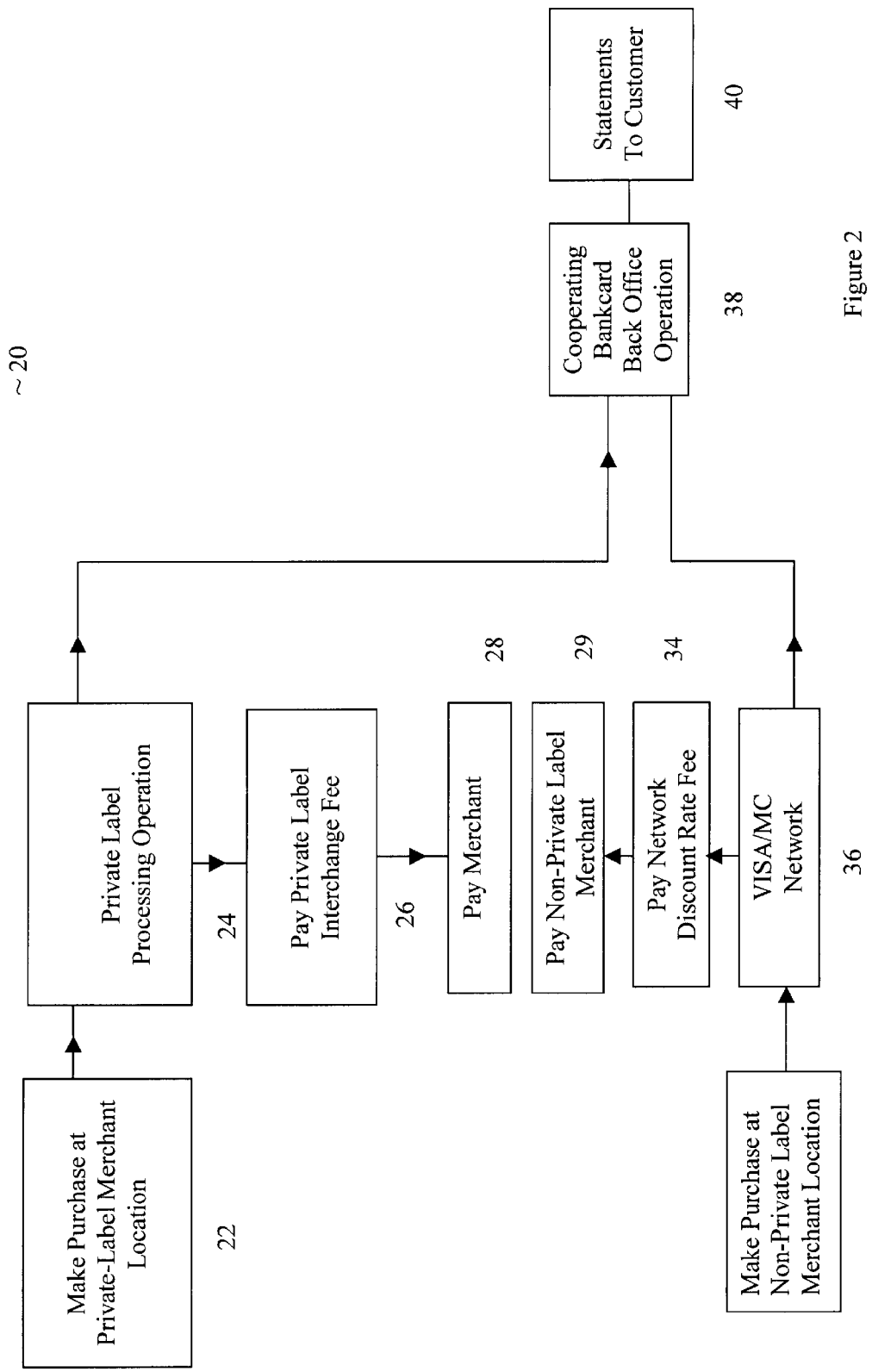
FIG. 2 illustrates the flow diagram of dual credit card usage.

FIG. 2 illustrates the flow diagram of the consumer use of the dual credit card 20. The user goes to the private label merchant physical location, catalog or Internet site to purchase goods or services and uses the dual credit card for payment 22. The merchant uses an in-store reader to communicate the card number, the merchant number and the level of purchase to the private label processing operation 24. The merchant credit card system is able to determine from the BIN number, a part of the credit card account number, that the purchase using the dual credit card should be processed though the private label system rather than the VISA/MC network. If the system detects a non-merchant bankcard, the purchase will be processed through the VISA/MC network.

If the purchase using the dual credit card is within the card users credit limit, the purchase is processed through the private label processing operation 24 including paying a private label interchange fee. The private label purchase is paid to the merchant, less the discount fee 26 and 28 by the private label processing operation 24.

The private label purchase charge is sent on to a cooperating bankcard back office operation 36 for further processing including cardholder statements and normal customer service, collections and settlement matters. The cardholder statements 40 are sent to the cardholder on a monthly basis.

FIG. 2 also illustrates the flow diagram of the consumer use of the dual credit card as a bankcard. The user goes to a non-private label merchant to purchase goods or services and uses the dual credit card for payment 30. The bankcard merchant uses an in-store reader to communicate the card number, the merchant number and the level of purchase to the bankcard network, such as VISA/MC 36. The bankcard merchant credit card system is able to determine that the purchase using the dual credit card should be processed though the VISA/MC network.

If the purchase using the dual credit card is within the card users bankcard credit limit, the purchase is processed through the bankcard network, such as VISA/MC network including paying a network interchange fee 34. The bankcard purchase is paid to the non-private label merchant less the interchange fee 34 by the bankcard network 36.

The bankcard purchase charge is sent on to a cooperating bankcard back office operation 38 for further processing including cardholder statements and normal customer service, collections and settlement matters. The cardholder statements 40 are sent to the cardholder on a monthly basis.

The advantages of such a dual credit card system for the private label merchant is that the customers have one card that can be used in two ways. One way as a private label credit card that provides the private label credit card merchant with a means to provide marketing information to his customers and to ensure that a portion of the credit line is protected for in store purchases The second way is the use of a recognized brand name card with a potential for lower credit card interchange than a standard bankcard or charge card. The promotional capabilities of a dual credit card are useful to both the merchant and the consumer.

The user of the dual credit card has the advantages of both a nationally recognized bankcard and a private label card. A recognized disadvantage of bankcards and charge cards is that, a consumer using such cards is not recognized by the merchant as a customer of that merchant. Many such customers enjoy getting catalogs and other mailing information from the merchants that they purchase from on a regular basis. Another advantage of the dual credit card is that the consumer has one less credit card to carry and/or keep track of.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of a computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation on a general-purpose microprocessor, the computer program code segments configure the microprocessor to create specific logic circuits. At each step of the process there is the involvement of a plurality of computers and a computer systems.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for this invention, but that the invention will include all embodiments falling within the scope of the appended claims.

What is claimed is:

1. A method for conducting a purchase transaction using a dual card, the method comprising:

receiving, by a merchant, dual card information identifying a dual card to be used to purchase an item, said dual card information including a single account number identifying a single account associated with said dual card;

determining, based on said single account number, that said single account number is a dual card account number and that a purchase transaction using said dual card is adapted to be processed over both a private label network and a bankcard network depending on an identity of said merchant;

determining an identity of said merchant; and processing said purchase transaction and transmitting said single account number using one of said private label network and said bankcard network based on said identity of said merchant.

2. The method of claim 1, further comprising:

applying a private label interchange fee if said purchase transaction is processed using said private label network.

3. The method of clam 1, wherein said merchant is a private label merchant and said purchase transaction is processed using said private label network.

4. The method of claim 1, wherein said merchant is a non-private label merchant, and said purchase transaction is processed using said bankcard network.

5. The method of claim 1, further comprising:

applying a bankcard interchange fee if said purchase transaction is processed using said bankcard network.

6. The method of claim 1, further comprising processing said purchase transaction by a cooperating bankcard back office operation.

7. The method of claim 6, wherein said processing said purchase operation includes at least one of: generating a statement, customer service, collections and settlement.

8. The method of claim 6, wherein said cooperating bankcard back office operation processes purchase transactions received from said private label network and from said bankcard network.

9. A method for processing a purchase transaction, comprising:

receiving, from a merchant, purchase information including information identifying a credit card account, a merchant number and an amount;

determining that said credit card account is a dual account identified by a single account number, said single account number adapted for processing over both a bankcard network and a private label network;

determining that said merchant is a private label merchant associated with said credit card account; and based on said determination that said merchant is a private label merchant and said determination that said credit card account is a dual account processing said purchase transaction using said private label network for transmission to a cooperating bankcard back office operation.

10. A method for processing a purchase transaction, comprising:

receiving, from a merchant, purchase information including information identifying a credit card account, a merchant number and an amount;

determining that said credit card account is a dual account identified by a single account number, said single account number adapted for processing over both a bankcard network and a private label network;

determining that said merchant is not a private label merchant associated with said credit card account; and based on said determination that said merchant is not a private label merchant and said determination that said credit card account is a dual account, processing said purchase transaction using said bankcard network for transmission to a cooperating bankcard back office operation.

11. A method, comprising:

receiving a request to purchase an item from a merchant using a credit card, said credit card having a single account number identifying a single credit account associated with said credit card;

identifying, based on said single account number, that said credit card is a dual credit card capable of being processed over both a private label network and a bankcard network depending on an identity of said merchant;

determining that said merchant is a private label merchant associated with said credit card; and based on said determination that said merchant is a private label merchant and said determination that said credit card is a dual credit card, processing said purchase transaction using said private label network.

12. The method of claim 11, wherein said identifying that said credit card is a dual credit card is performed based on a bank identification number portion of said single account number.

13. The method of claim 11, wherein said single credit account has a single interest rate and a single credit line.

14. The method of claim 13, wherein said single credit line has a portion which is available only for purchases at said private label merchant.

15. The method of claim 11, further comprising:

transmitting said purchase transaction to a cooperating bankcard back office operation for further processing.

16. A method, comprising:

receiving, at a merchant, a request to purchase an item using a credit card, said credit card having a single account number identifying a single credit account associated with said credit card;

identifying, based on said single account number, that said credit card is a dual credit card capable of being processed over both a private label network and a bankcard network depending on an identity of said merchant;

determining that said merchant is not a private label merchant associated with said credit card; and based on said determination that said merchant is not a private label merchant and said determination that said credit card is a dual credit card, processing said purchase transaction using said bankcard network.

17. The method of claim 16, wherein said identifying that said credit card is a dual credit card is performed based on a bank identification number portion of said single account number.

18. The method of claim 16, further comprising:

transmitting said purchase transaction to a cooperating bankcard back office operation for further processing.

19. An apparatus, comprising:

means for receiving a request to purchase an item from a merchant using a credit card, said credit card having a single account number identifying a single credit account associated with said credit card;

means for identifying, based on said single account number, that said credit card is a dual credit card capable of being processed over both a private label network and a bankcard network depending on an identity of said merchant;

means for determining that said merchant is a private label merchant associated with said credit card; and means for processing said purchase transaction using said private label network based on said determination that said merchant is a private label merchant and said determination that said credit card is a dual credit card.

20. A method for conducting a purchase transaction using a payment card, the method comprising:

receiving, by a merchant, payment card information identifying a payment card to be used to purchase an item, said payment card information including a payment card account number;

determining, based on said payment card account number, that a purchase transaction using said payment card is adapted to be routed over both a private label network and a bankcard network; and processing said purchase transaction using one of said private label network and said bankcard network based on an identity of said merchant and for further processing by a cooperating bankcard back office operation coupled to process purchase transaction received from said private label network and said bankcard network.

* * * * *